(12) United States Patent
Imaino et al.

(10) Patent No.: US 8,310,780 B2
(45) Date of Patent: Nov. 13, 2012

(54) METHOD AND APPARATUS FOR BIPOLAR SERVO MARKS WRITING WITH HIGH OUTPUT

(75) Inventors: Wayne I. Imaino, San Jose, CA (US); Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 12/839,515

(22) Filed: Jul. 20, 2010

(65) Prior Publication Data

US 2012/0019954 A1    Jan. 26, 2012

(51) Int. Cl.
*G11B 5/02* (2006.01)
(52) U.S. Cl. .......................................... 360/75
(58) Field of Classification Search ................ None
See application file for complete search history.

(56) References Cited

U.S. PATENT DOCUMENTS

| | | | |
|---|---|---|---|
| 5,168,395 A | 12/1992 | Klaassen et al. | |
| 5,426,543 A | 6/1995 | Dy et al. | |
| 5,867,639 A * | 2/1999 | Tuilier et al. | 714/6.1 |
| 6,134,070 A | 10/2000 | Tran et al. | |
| 6,381,086 B1 | 4/2002 | Koenig et al. | |
| 6,735,039 B1 * | 5/2004 | Molstad | 360/77.12 |
| 6,865,041 B1 | 3/2005 | Arnoldussen et al. | |
| 6,970,312 B2 * | 11/2005 | Yip et al. | 360/75 |
| 6,989,950 B2 * | 1/2006 | Ohtsu | 360/77.12 |
| 7,199,957 B2 | 4/2007 | Rothermel et al. | |
| 7,280,294 B2 | 10/2007 | Eaton | |
| 7,551,378 B2 * | 6/2009 | Eaton et al. | 360/75 |
| 7,551,380 B2 | 6/2009 | Watson et al. | |
| 2008/0186610 A1 | 8/2008 | Bui et al. | |

FOREIGN PATENT DOCUMENTS

WO    WO0211129 A1    2/2002

OTHER PUBLICATIONS

Schneider, Richard C.; "Write Equalization for Generalized (d,k) Codes"; IEEE Transactions on Magnetics, vol. 24, No. 6, Nov. 1988; pp. 2533-2535.
Haynes, M.K.; "Magnetic Recording Techniques for Buried Servos"; IEEE Transactions on Magnetics, vol. Mag-17, No. 6, Nov. 1981; pp. 2730-2734.
Patent Application; Method and Apparatus For Bipolar Servo Marks Writing with Self DC-Erase; Pierre-Olivier Jubert; U.S. Appl. No. 12/839,482, filed Jul. 20, 2010.

\* cited by examiner

*Primary Examiner* — Hoa T Nguyen
*Assistant Examiner* — James L Habermehl
(74) *Attorney, Agent, or Firm* — Schmeiser, Olsen & Watts

(57) ABSTRACT

A method and apparatus for bipolar servo marks writing with high output. The method includes providing a servo write head having first and second write gaps; and applying a varying current comprising either (i) abrupt changes in current in combination with current ramps or (ii) patterns of high-frequency current pulses before and after writing servo marks to a medium proximate to and moving past the first and second write gaps. The apparatus includes a bipolar servo write driver configured to generate a varying bipolar current signal having both negative and positive polarity currents and a servo write head having a first write gap and second write gap spaced apart, the varying current signal comprising either (i) abrupt changes in current in combination with current ramps or (ii) patterns of high-frequency current pulses before and after low-frequency pulses and a component to move a medium proximate to and past the first and second write gaps.

20 Claims, 7 Drawing Sheets

METHOD AND APPARATUS FOR BIPOLAR SERVO MARKS WRITING WITH HIGH OUTPUT

FIELD OF THE INVENTION

The present invention relates to the field of magnetic medium recording; more specifically, it relates to apparatuses and methods for bipolar writing servo marks to magnetic recording medium.

BACKGROUND

Magnetic recording systems (such as tape recording systems) record bits of information on a magnetic medium using a write/read head composed of write and read transducers. During both write and read operations, the recording heads need to be positioned accurately relative to recording data tracks of the magnetic medium. This is achieved by controlling the position of the write/read head in reference to servo marks prewritten on the magnetic medium. The position accuracy of the write/read data elements relative to data tracks strongly depends on the amplitude of the servo readback system. Present methods of writing servo marks increase readback amplitude at the cost of introducing undesirable pulses into the readback signal. These undesirable pulses can result in poor positioning of the read/write head causing data read errors. Alternatively, present methods of writing servo marks require pre-erasure of the servo tracks, which add another step into the servo mark writing process. Accordingly, there exists a need in the art to mitigate the deficiencies and limitations described hereinabove.

SUMMARY

A first aspect of the present invention is a method comprising: providing a servo write head having a first write gap and a second write gap spaced apart and an induction coil configured to generate respective magnetic fields proximate to the first and the second write gaps when a current is applied to the coil by a bipolar servo write driver, the bipolar servo write driver configured to generate both negative and positive polarity currents; generating a varying current signal using the bipolar servo write driver; moving a magnetic storage medium past the first and the second gaps in a direction from the first write gap toward the second write gap; the varying current signal includes a non-write phase, a preamble phase, a servo mark write phase and a closing phase; the varying current at an initial current level during the non-write phase; the preamble phase comprising an abrupt change in current from the initial current level to a first current level and a first current ramp from the first current level to a second current level; the servo mark write phase comprising current pulses between third and fourth current levels to write servo marks; the closing phase comprising a second current ramp from the second current level to the first current level and an abrupt change in current from the first current level to the initial current level; and wherein servo marks are written only during the servo mark write phase.

A second aspect of the present invention is a method, comprising: providing a servo write head having a first write gap and a second write gap spaced apart and an induction coil configured to generate respective magnetic fields proximate to the first and the second gaps when a current is applied to the coil by a bipolar servo write driver, the bipolar servo write driver configured to generate both negative and positive polarity currents; generating a varying current signal using the bipolar servo write driver; moving a magnetic storage medium past the first and the second write gaps in a direction from the first write gap toward the second write gap; the varying current signal comprises a non-write phase, preamble phase, a servo mark write phase and a closing phase; during the non-write phase, the varying current is at an initial current level; the preamble phase comprises a preamble pattern of high-frequency current pulses between a first current level and a second current level and back to the first current level; the servo mark write phase comprises a servo mark pattern of low-frequency current pulses between the first current level and the second current level and back to the first current level for writing servo marks; the closing phase comprises a closing pattern of high-frequency current pulses between the first current level and the second current level and back to the first current level; and wherein servo marks are written only during the servo mark write phase.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

DETAILED DESCRIPTION

The present invention is directed to new methods for producing high output timing-based magnetic servo patterns on an AC erased magnetic storage media. The methods utilize preambles before servo write and closings after servo write. The preambles before servo write create a transition from an AC erased media to a DC erased media immediately before the servo marks. The closings after servo write create a transition from a DC erased media back to an AC erased media immediately after the servo marks. In first embodiments, the preambles are abrupt current changes prior to current ramps and the closings are current ramps followed by abrupt current changes. This method improves considerably the efficiency in reducing undesired readback pulses by tailoring the write current ramp more effectively. In second embodiments, both the preambles and closings are sets of high-frequency current pulses. The second embodiments achieve high output timing-based servo signal on AC erased media without the need to control a ramp of current. The transition from AC erase media to DC erase media before and after the servo marks is made using properly designed high-frequency write current signals.

Figure 1A:
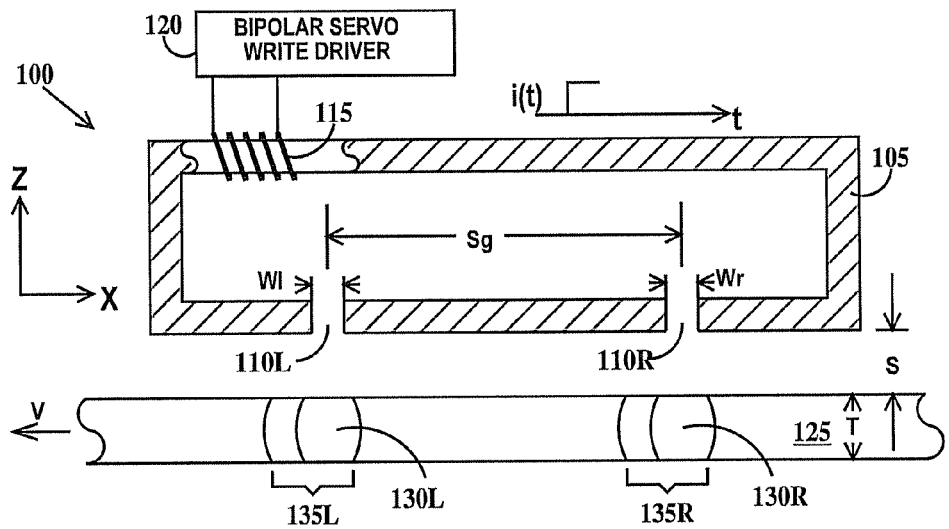
FIG. 1A is a cutaway cross-section view through line 1A-1A of FIG. 1B illustrating a servo write head according to an embodiment of the present invention.
Figure 1B:
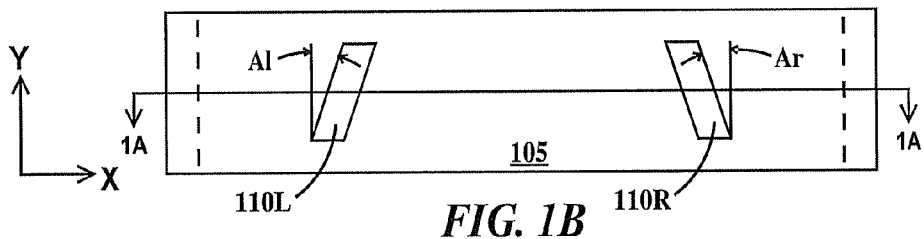
FIG. 1B is a bottom view of the servo write head of FIG. 1A.

FIG. 1A is a cutaway cross-section view through line 1A-1A of FIG. 1B illustrating a servo write head according to an embodiment of the present invention. In FIG. 1A, a dual-gap servo write head 100 includes ferromagnetic body 105 having a left gap 110L and a right gap 110R spaced a center-to-center distance Sg apart and an induction coil 115. Ferromagnetic body 105 need not be formed from iron but has the property of being ferromagnetic. Left and right gaps 110L and 110R have respective widths Wl and Wr. Induction coil 115 is electrically connected to a bipolar DC servo write driver 120 which generates a varying current signal that is applied to induction coil 115. Opposite ends of coil 115 are electrically connected to respective positive and negative current terminals of bipolar servo write driver 120. A magnetic tape 125 having a thickness T is spaced a distance S (in the Z-direction) under dual-gap servo write head 100 and is moving at a velocity V in the X-direction. When a current i(t) is applied to coil 115, a magnetic write bubble 130L is induced in magnetic tape 125 under gap 110L which magnetizes a region 135L of the magnetic tape. The same current i(t) induces a magnetic write bubble 130R in magnetic tape 125 under gap 110R which magnetizes a region 135R of the magnetic tape. The magnetic regions 135L and 135R are wider (in the X-direction) than the write bubbles because magnetic tape 125 is moving from right to left while the write current i(t) remains at a constant positive value in this example.

Regions 135R and 135L will be magnetized when the write field strengths in the X-direction (Hx) generated by the gaps 110L and 110R are greater than the coercivity of the magnetic medium (Hc). Each write bubble 130L and 130R has two edges. The leading edge is the rightmost edge and the trailing edge is the leftmost edge. The average width (in the X-direction) of write bubbles 130L and 130R depends on the distance S, the amplitude of the write current, the widths Wl and Wr, and the coercivity of magnetic tape 125. For optimum writing, the widths of write bubbles 130L and 130R should be about the same as the widths of gaps 110L and 110R respectively. Wl and Wr may be the same or may be different. As can be seen, both regions 135L and 135R are written at the same time. The widths (in the X-direction) of regions 135L and 135R are a function of the velocity V of magnetic tape 125, the time duration of the current i(t), and the write bubble parameters discussed supra.

FIG. 1B is a bottom view of the servo write head of FIG. 1A. In FIG. 1B, gaps 110L and 110R are trapezoidal in shape and are tilted in the Y-direction by respective angles Al and Ar. Gaps 110L and 110R are tilted toward each other. The X, Y and Z directions are mutually orthogonal. The magnitudes of angles Al and Ar may be the same or different.

Although magnetic tape 125 is depicted as under servo write heads 100 and 140, alternatively, FIG. 1A may be rotated 180° about the Y-axis so the magnetic tape passes over the servo write heads in which case FIG. 1B would depict the top surface of the servo write heads.

Figure 1C:
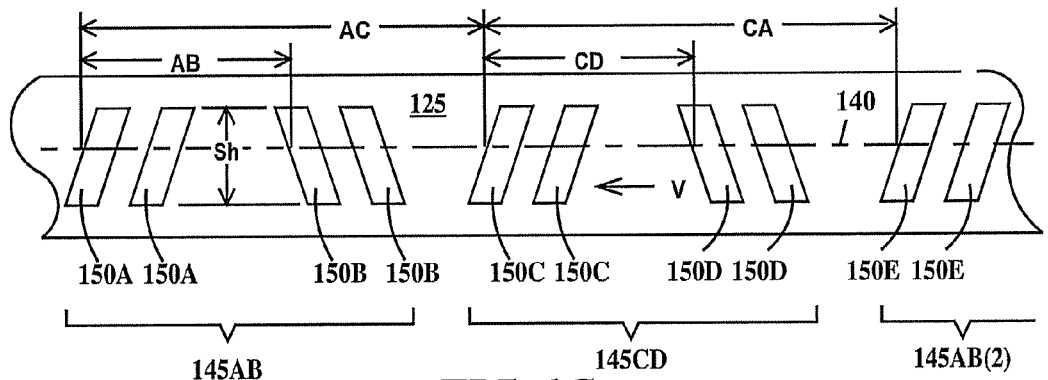
FIG. 1C is a top view of servo mark positions on magnetic tape.

FIG. 1C is a top view of servo mark positions on a magnetic tape. In FIG. 1C, only one servo track is depicted. There may be multiple servo tracks on the same tape parallel to each other. Magnetic tape 125 has a servo mark centerline 140 and two sets of servo marks; an "AB" set 145AB and a "CD" set 145CD. Set 145AB includes two servo marks 150A written by gap 110L (of FIG. 1A) and two servo-marks 150B written by gap 110R (of FIG. 1A). Set 145CD includes two servo marks 150C written by gap 110L (of FIG. 1A) and two servo marks 150D written by gap 110R (of FIG. 1A). FIG. 1C also shows the start of a following "AB" servo mark 145AB(2) having two servo marks 150E written by gap 110R (of FIG. 1A). Set 145AB is written by applying two write pulses to servo write head 100. Set 145CD is written by applying two write pulses to servo write head 100 after set 145AB has been written. Set 145AB(2) is written by applying two write pulses to servo write head 100 after set 145CD has been written. "AB" and "CD" servo marks will alternate along the length of magnetic tape 125. The servo track has a width Sh and several distances along the length of the tape (X-direction) are defined. The distance from the left (right) edge (all measurement are along centerline 140) of the leftmost servo mark 150A to the left (right) edge of leftmost servo mark 150B is AB. The distance AB is equal to the gap-to-gap distance Sg of FIG. 1A. The distance from the left (right) edge of the leftmost servo mark 150C to the left (right) edge of leftmost servo mark 150D is CD. The distance CD is equal to the gap-to-gap distance Sg of FIG. 1A. The distance from the left (right) edge of the leftmost servo mark 150A to the left (right) edge of leftmost servo mark 150C is AC. The distance from the left (right) edge of the leftmost servo mark 150C to the left (right) edge of leftmost servo mark 150E is CA. While pairs of servo marks 150A, 150B, 150C and 150D (and 150E) are illustrated, there may be one or more servo marks 150A, 150B, 150C and 150D (and 150E). Also the number of servo marks in the AB servo mark pairs may be different from the number of servo marks in the CD servo mark pairs.

Figure 2A:
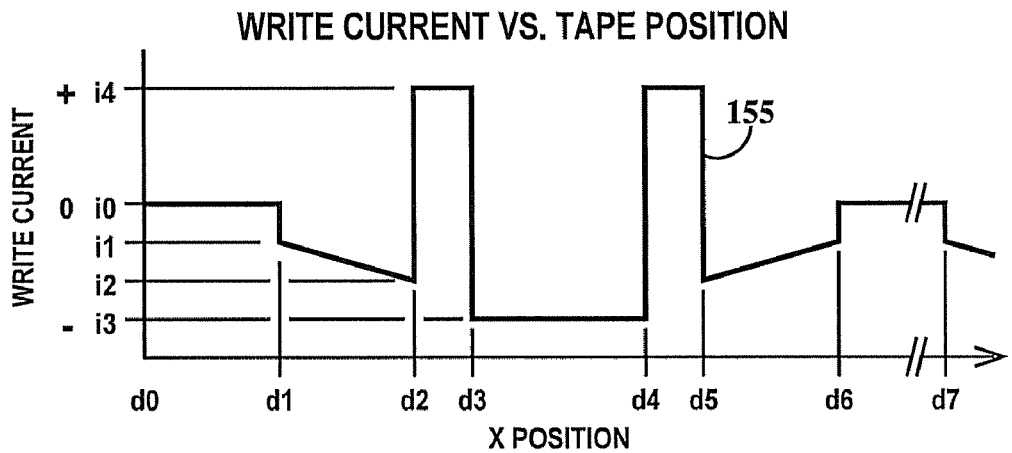
FIG. 2A is plot of write current levels to be applied to servo write heads versus medium position according to first embodiments of the present invention.

FIG. 2A is plot of write current levels to be applied to servo write heads versus medium position according to first embodiments of the present invention. Magnetic tape passing the servo write head is magnetized when the applied current has sufficient amplitude (either positive or negative). In the present illustration positive current writes the magnetic medium in the +X-direction and is used for writing servo marks. Negative current writes the magnetic medium in the −X-direction and is used for DC-erasing the magnetic medium before and after each servo mark as well as for transitioning from the AC erased state to the DC erased state before writing the servo marks and for transitioning from the DC erased state to the AC erased state after writing the servo marks. Alternatively, positive currents may be used to erase and negative currents to write.

Returning to FIG. 2A, the current waveform 155 is generated, for example, by bipolar servo write driver 120 of FIG. 1A. In FIG. 2A, d0, d1, d2, d3, d4, d5, d6 and d7 are positions along the magnetic tape that define sequential segments of the tape. The positions can also be thought as defining the lengths of the segments or distances between positions along the tape. Between positions d0 and d1 a current i0 is applied. Current i0 is either zero current, or a near zero current (a near zero current is defined as a positive or negative current that does not change the magnetic state of the medium). At d1 the current abruptly transitions to i1. An abrupt change in current is defined as a rate change in current (dI/dt) primarily limited by the rise or fall time of the write driver and can be as short as a few (e.g., 5) nano-seconds (ns). At a tape velocity (V) of 5 meters/second (m/s), 5 ns corresponds to a distance of 0.025 µm. Between d1 and d2, the currents ramps from i1 to i2. At d2, the current abruptly transitions to i4. In the example of FIG. 2A, current i4 is positive enough to write the servo track and define the left edge of the servo mark. Between d2 and d3, the current remains at i4. At d3 the current abruptly transitions to i3. Between d3 and d4 the current remains at i3. In the example of FIG. 2A, current i3 is negative enough to define the right edge of the servo mark as well as DC erase the servo track. At d4 the current abruptly transitions to i4 and defines the left edge of the second servo mark. Between d4 and d5, the current remains at i4. At distance d5 the current abruptly transitions to i2 and defines the right edge of the second servo mark. In FIG. 2A, N=2 servo marks are written.

The number N of servo marks can be any integer equal to or greater than one. To write N servo marks, N positive write pulses occur between d2 and d5. Each write pulse corresponds to the write current abruptly transitioning from a negative current (of amplitude i2 or i3) to a positive current (of amplitude i4) to a negative current (of amplitude i2 or i3). Between d5 and d6, the currents ramps from i2 to i1. At d6, the current abruptly transitions to i0. The current remains at i0 between d6 and d7 (between d7 and d1 AB servo marks are written; d7 is equivalent to d1 when writing CD servo marks). The distance between d6 and d7 prevents overwriting of the AB servo marks with the CD servo marks. Between d1 and d2 and between d5 and d6 the medium is only partially written through its depth. The segments between d1 and d2 and between d5 and d6 correspond respectively to the transition from AC-erased medium to DC-erased medium before the servo marks and from DC-erased medium to AC erased medium after the servo marks. Servo marks are written only in the segments between d2 and d5. In the example of FIG. 2A, i4>(i0≈0)>i1>i2>i3. Alternatively, i4<(i0≈0)<i1<i2<i3. In one example, |i4|=|i3|.

The pattern of write current described in FIG. 2A repeats to define the CD servo marks. If servo marks of the CD pairs are identical to the servo marks of the AB pairs (in number, width and spacing), then the distances d7-d6 (or d1-d0), d6-d5, d5-d4, d4-d3, d3-d2, d2-d1 don't need to be changed. In the more general case, the number of servo marks in the CD pairs and in the AB pairs may be different and the distances d7-d6, d6-d5, d5-d4, d4-d3, d3-d2, d2-d1 are adjusted for writing each pair of servo marks: $(d7-d6)_{AB}$, $(d6-d5)_{AB}$, $(d5-d4)_{AB}$, $(d4-d3)_{AB}$, $(d3-d2)_{AB}$, $(d2-d1)_{AB}$ for writing the AB pairs and $(d7-d6)_{CD}$, $(d6-d5)_{CD}$, $(d5-d4)_{CD}$, $(d4-d3)_{CD}$, $(d3-d2)_{CD}$, $(d2-d1)_{CD}$ for writing the CD pairs. If the number of servo marks in the AB servo mark pairs is N1 and the number of servo marks in the CD servo mark pairs is N2, then N1 positive pulses are applied during $(d5-d2)_{AB}$ to write the AB marks and N2 positive pulses are applied during $(d5-d2)_{CD}$ to write the CD servo marks. Both N1 and N2 are positive integers greater than one. If the number of AB and CD servo marks are the same then N1 equals N2. If the number of AB and CD servo marks are not the same then N1 does not equal N2.

The X-scale of FIG. 2A may be converted from a medium position scale to a time scale by dividing the position scale by the velocity V of the magnetic tape past the servo write head. When write current is plotted versus the position of the moving magnetic medium positions d0, d1, d2, d3, d4, d5 and d6 are used. By dividing by V, the distance d1-d0 becomes a time interval t1, d2-d1 becomes a time interval t2, d5-d2 becomes a time interval t3, d6-d5 becomes a time interval t4; and the distance d7-d6 becomes a time interval t5.

In terms of tape position, in the distance d2-d5 the current alternates (in pulses of controlled time duration) from negative to positive to negative two times (in this example) to write a pair of A and B servo marks (or C and D servo marks). Note that the width of the servo marks is defined by the duration of the positive pulses and is independent of the width of the write gap. Similarly, the distance between two marks is defined by the duration of the negative current between two consecutive positive current pulses and is independent of the width of the write gap. Moreover, the servo mark edges are defined by the trailing edge of the write gap only. In terms of time, during time t3 the current alternates from negative to positive to negative two times (in this example) to write a pair of A and B servo marks (or C and D servo marks). The same sequence can be repeated for additional A and B servo mark pairs and additional C and D servo marks pairs.

The inequalities of Table I set a limitation for the duration of the current ramps. Using the notation of the general case, for AB pulses $d1ab=(d2-d1)_{AB}$, $d2ab=(d5-d2)_{AB}$, $d3ab=(d6-d5)_{AB}$, and $d4ab=(d7-d6)_{AB}$. For CD pulses $d1cd=(d2-d1)_{CD}$, $d2cd=(d5-d2)_{CD}$, $d3cd=(d6-d5)_{CD}$ and $d4cd=(d7-d6)_{CD}$ which gives:

$$AC = d2ab + d3ab + d4ab + d1cd \quad (1)$$

$$CA = d2cd + d3cd + d4cd + d1ab \quad (2)$$

The current ramps are d1ab, d3ab, d1cd and d3cd. Wl, Wr and Sg are illustrated in FIG. 1A. Angles Al and Ar are illustrated in FIG. 1B. Distances AB=CD=Sg, AC, CA and servo track width Sh are illustrated in FIG. 1C.

TABLE I

| In order that: | The following condition must be satisfied: |
|---|---|
| 1 There be no overwrite of B marks after d3ab | d3ab < Sg − d2ab − Wl − [(Sh/2) * ((tan(Al) + tan(Ar))] |
| 2 There be no overwrite of B marks after d4ab | d1cd < AC − Sg − d2ab − [(Sh/2) * ((tan(Al) + tan(Ar))] |
| 3 There be no overwrite of D marks after d3cd | d3cd < Sg − d2cd − Wl − [(Sh/2) * ((tan(Al) + tan(Ar))] |
| 4 There be no overwrite of D marks after d4cd | d1ab < CA − Sg − d2cd − [(Sh/2) * ((tan(Al) + tan(Ar))] |

Where:
Sg is the center-to-center distance between the left and right gaps (see FIG. 1A);
Wl is the width of the left gap in the X-direction;
Wr is the width of the right gap in the X-direction;
Al is the angle of the left gap slanted away from the Y-direction;
Ar is the angle of the right gap slanted away from the Y-direction;
d1ab, d2ab, d3ab, d4ab, d1cd, d2cd, d3cd and d4cd are sequential segments along the magnetic tape in the X-direction where:
  in segment d1ab the current ramps negative;
  in segment d2ab the current pulses from negative to positive and back to negative N1 times, where N1 is a positive integer equal to or greater than one;
  in segment d3ab the current ramps positive;
  in segment d4ab the current is zero or near zero;
  in segment d1cd the current ramps negative;

in segment d2cd the current pulses from negative to positive and back to negative N2 times, where N2 is a positive integer equal to or greater than one;

in segment d3cd the current ramps positive;

in segment d4cd the current is zero; and

Sh is the width of the servo track in the Y-direction; and the X-direction is defined as the direction of movement of the magnetic storage medium (e.g., magnetic tape) from the right gap to the left gap and the Y-direction is defined as a direction in the plane of the medium perpendicular to the X-direction.

Note that the number N1 of servo marks in the AB servo mark pairs may be the same as the number of server mark N2 in the CD servo mark pairs (N1=N2), or the number N1 of servo marks in the AB servo mark pairs may be different from the number of server mark N2 in the CD servo mark pairs (N1≠N2).

Figure 2B:
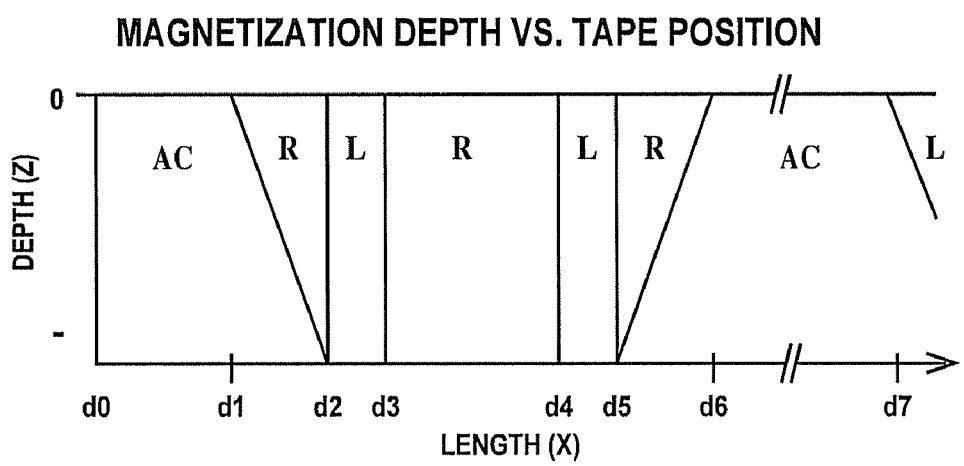
FIG. 2B is a sectional view of the magnetization state of the medium plotted as medium depth versus medium position generated by the write signal of FIG. 2A.

FIG. 2B is a sectional view of the magnetization state of the medium plotted as medium depth versus medium position generated by the write signal of FIG. 2A. The section is along the Y-direction for a region of the medium. In FIG. 2B, the regions labeled "L" are written with the magnetization in the −X (left) direction, and the regions labeled "R" are written with the magnetization in the +X (right) direction. and the regions labeled "AC" remain AC-erased.

Figure 2C:
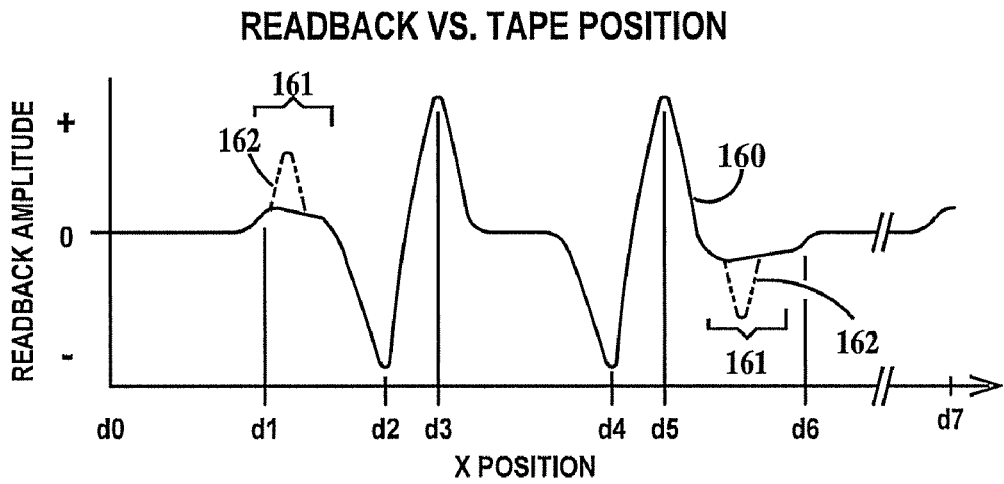
FIG. 2C is a plot of the readback signal of medium written with the write signal of FIG. 2A.

FIG. 2C is a plot of the readback signal of medium written with the write signal of FIG. 2A. In FIG. 2C waveform 160 represents the readback signal. It is instructive to compare regions 161 of waveform 160 to dashed waveforms 162. Regions 161 are regions of undesired signal. Ideally, the signal would be zero in regions 161. Dashed waveforms 162 represent the undesired signal that would be present without the abrupt transitions of current from i0 to i1 at d1 and from i2 to i0 at d6 on waveform 155 of FIG. 2A (i.e., with a ramp from i0 at d1 to i2 at d2 and a ramp of i2 at d5 to i0 at d6). As can be seen the abrupt change in current at X-positions d1 and d2 significantly reduces the amplitude of the undesired signal when compared to a ramp only.

The amplitude of the undesired signal in regions 161 is directly related to the extension of the magnetization transition from fully AC erased (across the depth of the medium) to fully DC erased (across the depth of the medium). The more abrupt this magnetization transition, the larger the undesired signal in 161. Inversely, the more extended the transition of the medium magnetization from fully AC erased to fully DC erased, the smaller the undesired signal in 161. As depicted in the FIG. 2B, a slow ramp in write current from i1 to i2 does result in an extended transition of the medium magnetization from fully AC erased to fully DC erased. Similarly, a slow ramp in write current from i2 to i1 does result in an extended transition of the medium magnetization from fully DC erased to fully AC erased. The longer the ramp in current, the smaller the undesired signal in regions 161.

However, there is a limit to the extent of the current ramp for a given timing based servo pattern as discussed supra. In Linear Tape Open (LTO) technology tape drives with d2ab=17 μm, d3cd=22 μm, AB=50 μm, AC=CA=100 μm, Al=Ar=6°, Sh=186 μm and further assuming that d1ab=d3ab=d1cd=d3cd, the maximum ramp length is about 7.4 μm.

To optimize the ramp of the write current, current levels i1 and i2 need to be selected appropriately. Below a certain value of write current, the write head does not produce fields that are large enough to change the magnetization state of the medium. This minimum current value required to write in the medium depends on the head medium spacing S, the write gap dimensions and the medium coercivity. Above a certain value of write current, the write head produces fields that are large enough to write the full depth of the medium, but still lower than the current needed to write optimum straight magnetization transitions (current levels i3 and i4). In FIG. 2A, the current i1 is required to be comparable to the minimum current value required to change the magnetization in the medium and i2 is required to be comparable to the current just required to write fully through the medium. The length of tape over which the ramp is applied is limited in length and should be short as discussed supra. With ramps starting at i0 and ending at i3, the length of tape over which the ramp is applied would generally be large and therefore there would be an increase in the amplitude of the undesired signal compared to the optimized ramps lengths of the present invention. The optimized ramps of the present invention have an abrupt change of current from i0 to i1 at d1 and from i1 to i0 at d6. The write current is ramped from i1 to i2 between d1 and d2 and ramped from i2 to i1 between d5 and d6. Using this method and for a ramp of current spreading over 5 μm of the medium (d2−d1=5 μm), the amplitude of the undesired pulses in a thick medium (e.g., 100 nm) can be reduced to less than 10% of the amplitude of the timing based servo signal (at d3 and d4). This result is based on a numerical calculation with a write gap of 500 nm, a head-medium spacing of 30 nm, a servo reader of width of 3.5 μm and of 310 nm read gap. Comparatively, using a slope from i0 to i3 (and from i3 to i0) leads to undesired peaks in regions 161 of about 35% of the amplitude of the timing based servo signal. It can also be shown that the abrupt ramp method is also efficient for a thin medium (e.g., 50 nm), whereas methods using a ramp starting at i0 were not, which is an unexpected benefit. In a thin medium the amplitude of the undesired pulses was reduced to less than 20% of the amplitude of the timing based servo signal.

Figure 3A:
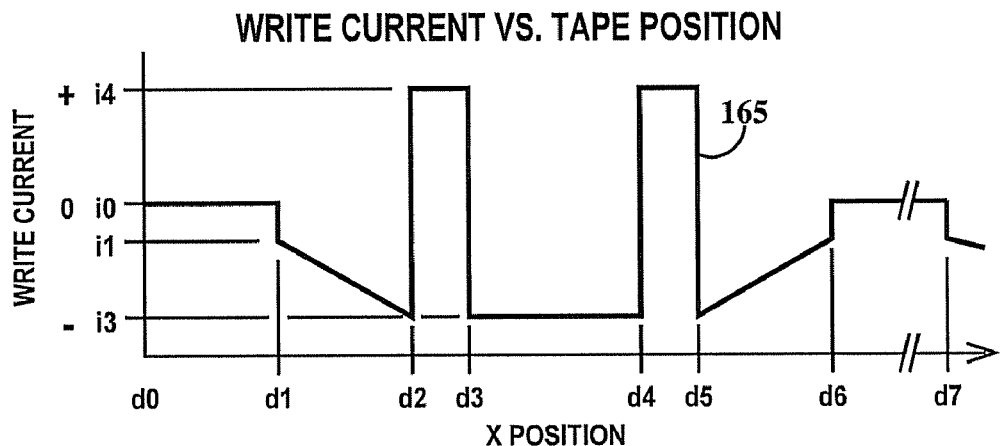
FIGS. 3A and 3B are plots of write current levels to be applied to servo write heads versus medium position according to alternative first embodiments of the present invention.
Figure 3B:
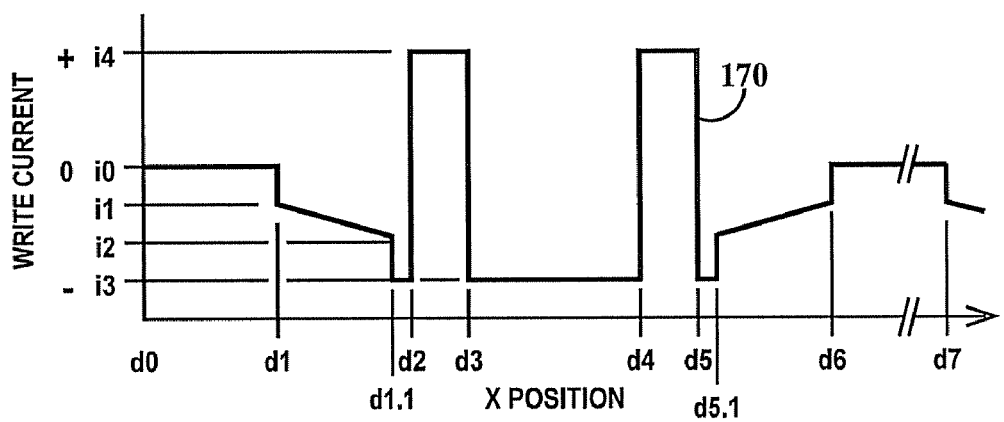

FIGS. 3A and 3B are plots of write current levels to be applied to servo write heads versus medium position according to an alternative first embodiment of the present invention. Waveform 165 of FIG. 3A is similar to waveform 155 of FIG. 2A, except between d1 and d2 the current ramps from i1 to i3 instead of to i2, and between d5 and d6 the current ramps from i3 to i1 instead of from i2. In FIG. 3A, i4>(i0≈0)>i1>i3. Alternatively, i4<(i0≈0)<i1<i3. In FIG. 3A, the ramps extend to the same current level as between the pulses. Waveform 170 of FIG. 3B is similar to waveform 155 of FIG. 2A except between d1 and d1.1 the current ramps from i1 to i2, from d1.1 to d2 the current abruptly decreases to i3 and remains at i3 until d2 where the current abruptly transitions to i4, at d5 the current abruptly decreases to i3 where it remains until d5.1 where it abruptly transitions to i2, and between d5.1 and d6 the current ramps from i2 to i1. In FIG. 3B, i4>(i0≈0)> i1>i2>i3. Alternatively, i4<(i0≈0)<i1<i2<i3. In FIG. 3B, an abrupt change to the current level between pulses intervenes between the ramps and the current pulses.

In second embodiments of the present invention, patterns of high-frequency write currents are used in the preamble and closing. The inequalities of Table I, discussed infra, set a limitation for the duration of the high-frequency preamble and closing.

Figure 4A:
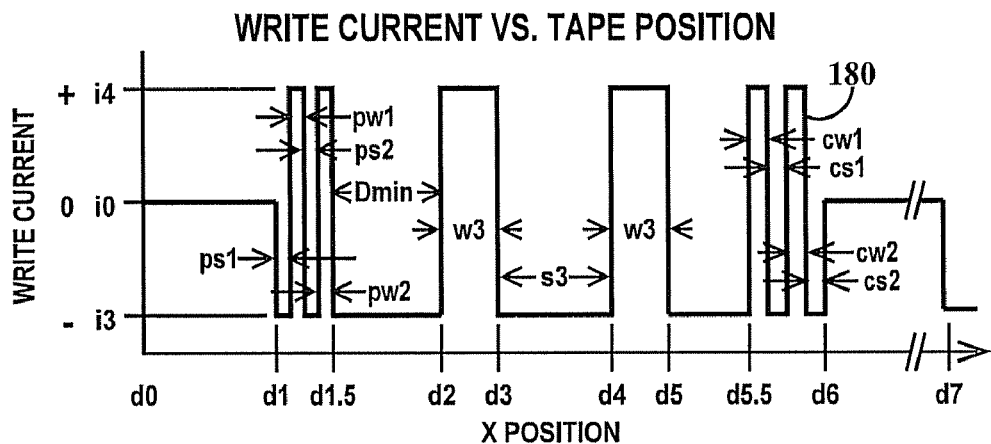
FIG. 4A is a plot of write current levels to be applied to servo write heads versus medium position according to second embodiments of the present invention.

FIG. 4A is a plot of write current levels to be applied to servo write heads versus medium position according to second embodiments of the present invention. Magnetic tape passing the servo write head is magnetized when the applied current has sufficient amplitude (either positive or negative). In the present illustration positive current writes the magnetic medium in the +X-direction and is used for writing servo marks and during the high frequency preamble and closing. Negative current writes the magnetic medium in the −X-direction and is used for DC-erasing the magnetic medium on either side of each servo mark and during the high frequency preamble and closing. Alternatively, positive currents may be used to erase and negative currents to write.

In FIG. 4A, a current waveform 180 is generated, for example, by bipolar servo write driver 120 of FIG. 1A. In FIG. 4A, d0, d1, d1.5, d2, d3, d4, d5, d5.5, d6 and d7 are positions along the magnetic tape that define sequential segments of the tape. The positions can also be thought as defining the lengths of the segments or distances between positions along the tape. Between d0 and d1 a current i0 is applied. Again, current i0 is either zero current, or a near zero current. At distance d1 the current abruptly drops to i3. Between d1 and d1.5, a pattern of M high-frequency current pulses varying from i3 to i4 and back to i3 are applied. In FIG. 4A, M=2, but M may be any integer equal to or greater than one. Between d1.5 and d2 the current remains at i3. There is a minimum value for d2-d1.5 called $D_{min}$. $D_{min}$ is about equal to the width of the read gap of the read head to be used to read the servo marks. At d2, the current abruptly transitions to i4. In the example of FIG. 4A, current i4 is positive enough to write the servo track and define the left edge of each servo mark. Between d2 and d3, the current remains at i4. At d3 the current abruptly transitions to i3. Between d3 and d4 the current remains at i3. In the example of FIG. 4A, current i3 is negative enough to define the right edge of each servo mark and DC erase the servo track immediately before and after each servo mark. At d4 the current abruptly transitions to i4 and defines the left edge of the second servo mark. Between d4 and d5, the current remains at i4. At d5 the current abruptly transitions to i3 and defines the right edge of the second servo mark. Between d2 and d5 there are N servo low-frequency write pulses. In one example, the pulse widths and distances between pulses for the patterns of high-frequency current pulses (between d1 and d1.5 or between d5.5 and d6) are 10 to 200 times smaller than the pulse widths and distances between the pulses for the low-frequency write pulses (between d2 and d5). In FIG. 4A, N=2, but N can be any integer equal to or greater than one. To write N servo marks, N positive write pulses take place between d2 and d5. Each low-frequency write pulse corresponds to the write current abruptly transitioning from negative current (e.g., i3) to positive current (e.g., i4) to negative current (e.g., i3). Between d5 and d5.5 the current remains at i3. Between d5.5 and d6, a pattern of P high-frequency pulses from i3 to i4 and back to i3 are applied. In FIG. 4A, P=2, but P may be any integer equal to or greater than one. P may be the same or different from M. The value of d5.5-d5 is greater than or equal to $D_{min}$. At d6 the current returns to i0. The current remains at i0 for a distance d7-d6 (if d6-d0 writes AB servo marks, then d7 is equivalent to d1 for writing CD servo marks). The distance d7-d6 prevents overwriting of the AB servo marks by the CD servo marks. In the distance d1.5-d1 and d6-d5.5 magnetization transitions are written in the medium, but they are positioned so close to each other that their contributions to the readback signal is very small, if any. Servo marks are written only in the distance d5-d2.

Because the last written magnetic domain has the size of the write-bubble, the pattern of high-frequency current pulses of the closing should be slightly different from the pattern of high-frequency current pulses of the preamble in that the width of and distances between high-frequency pulses in the closing (cw1, cs1, cw2, cs2) are different than in the preamble (ps1, pw1, ps2, pw2). It is preferred that pw1≠pw2 and ps1≠ps2, or pw1=pw2 and ps1≠ps2, or pw1≠pw2 and ps1=ps2. It is preferred that cw1≠cw2 and cs1≠cs2, or cw1=cw2 and cs1≠cs2, or cw1≠cw2 and cs1=cs2. In other words, it is preferred that the preamble and closing not consist of periodic pulses (i.e., not consist of a repeating pattern of same width pulses spaced the same distance apart) but be patterns of high frequency pulses of controlled and varying widths and spaces. The width of the lower-frequency write pulses is w3 and the space between pulses is s3. w3>>w1 or w2 and s3>>s1 or s2.

The X-scale of FIG. 4A may be converted from a medium position scale to a time scale by dividing the position scale by the velocity V of the magnetic tape past the servo write head. When write current is plotted versus the position of the moving magnetic medium distances, d0, d1, d1.5, d2, d3, d4, d5, d5.5 and d6 are used. By dividing by V, the distance d1-d0 becomes a time interval t1, d1.5-d1 becomes a time interval t2, d2-d1.5 becomes a time interval t3, d5-d2 becomes a time interval t4, d6-d5.5 becomes a time interval t5, d6-d5.5 becomes a time interval t6; and the distance d7-d6 becomes a time interval t7. In FIG. 2A, i4>(i0≈0)>i3. Alternatively, i4<(i0≈0)<i3. It is preferred that |i4|=|i3|, however, in one example, |i4|≠|i3|.

The pattern of write current described in FIG. 4A repeats to define the CD servo marks. If servo marks of the CD pairs are identical to the servo marks of the AB pairs (in number, width and spacing), then the distances d7-d6 (or d1-d0), d6-d5, d5-d4, d4-d3, d3-d2, d2-d1 don't need to be changed. In the more general case, the number of servo marks in the CD pairs and in the AB pairs may be different, and the distances d7-d6, d6-d5, d5-d4, d4-d3, d3-d2, d2-d1 are adjusted for writing each pair of servo marks: $(d7-d6)_{AB}$, $(d6-d5)_{AB}$, $(d5-d4)_{AB}$, $(d4-d3)_{AB}$, $(d3-d2)_{AB}$, $(d2-d1)_{AB}$ for writing the AB pairs and $(d7-d6)_{CD}$, $(d6-d5)_{CD}$, $(d5-d4)_{CD}$, $(d4-d3)_{CD}$, $(d3-d2)_{CD}$, $(d2-d1)_{CD}$ for writing the CD pairs. If the number of servo marks in the AB servo mark pairs is N1 and the number of servo marks in the CD servo mark pairs is N2, then N1 positive pulses are applied during $(d5-d2)_{AB}$ to write the AB marks and N2 positive pulses are applied during $(d5-d2)_{CD}$ to write the CD servo marks. Both N1 and N2 are positive integers greater than one. If the number of AB and CD servo marks are the same then N1 equals N2. If the number of AB and CD servo marks are not the same then N1 does not equal N2.

In the general case, the number and pattern of M pulses and P pulses used in the preamble and closing may be the same or different for AB and CD servo mark pairs, regardless of whether or not the number of servo marks in the AB pairs are the same as in the CD pairs. AB servo mark pairs may use a pattern of M1 and a pattern of P1 pulses, and CD pairs may use a pattern of M2 pulses and a pattern of P2 pulses. It is preferred that the patterns of P1, P2, M1 and M2 pulses not consist of periodic pulses (i.e., not consist of a repeating pattern of same width pulses spaced the same distance apart) but be patterns of high frequency pulses of controlled and varying widths and spaces. M1, M2, P1 and P2 are positive integers greater than one. This yields multiple permutations, ten of which are: (1) N1=N2, M1=M2=P1=P2; (2) N1=N2, M1=M2, P1=P2, M1≠P1; (3) N1=N2, M1≠M2, P1=P2; (4) N1=N2, M1=M2, P1≠P2; (5) N1=N2, M1≠M2, P1≠P2; (6) N1≠N2, M1=M2=P1=P2; (7) N1≠N2, M1=M2, P1=P2, M1≠P1; (8) N1≠N2, M1≠M2, P1=P2; (9) N1≠N2, M1=M2, P1≠P2; (10) N1≠N2, M1≠M2, P1≠P2.

In terms of tape position, in between d2-d5 the current alternates (in pulses of controlled time duration) from negative to positive to negative two times (in this example) to write a pair of A and B servo marks (or C and D servo marks). Note that the width of the servo marks is defined by the duration of the positive pulses and is independent of the width of the write gap. Similarly, the distance between two marks is defined by the duration of the negative pulses and is independent of the width of the write gap. Moreover, the servo mark edges are defined by the trailing edge of the write gap only. In terms of time, during time t4 the current alternates from negative to positive to negative to positive to negative to write a pair of A and B servo marks (or C and D servo marks). The same sequence can be repeated for additional A and B servo mark pairs and additional C and D servo marks pairs.

The inequalities of Table I set a limitation for the duration of the pattern of high-frequency current pulses. Using the notation of the general case, for AB pulses d1ab=(d2-d1)$_{AB}$, d2ab=(d5-d2)$_{AB}$, d3ab=(d6-d5)$_{AB}$, and d4ab=(d7-d6)$_{AB}$. For CD pulses d1cd=(d2-d1)$_{CD}$, d2cd=(d5-d2)$_{CD}$, d3cd=(d6-d5)$_{CD}$ and d4cd=(d7-d6)$_{CD}$ which gives:

$$AC = d2ab + d3ab + d4ab + d1cd \quad (1)$$

$$CA = d2cd + d3cd + d4cd + d1ab \quad (2)$$

The patterns of high-frequency current pulses occur in d1ab, d3ab, d1cd and d3cd. Wl, Wr and Sg are illustrated in FIG. 1A. Angles Al and Ar are illustrated in FIG. 1B. Distances AB=CD=Sg, AC, CA and servo track width Sh are illustrated in FIG. 1C, in which:

Sg is the center-to-center distance between the left and right gaps;

Wl is the width of the left gap in the X-direction;

Al is the angle of the left gap slanted away from the Y-direction;

Ar is the angle of the right gap slanted away from the Y-direction;

d1ab, d2ab, d3ab, d4ab, d1cd, d2cd, d3cd and d4cd are sequential segments along the magnetic tape in the X-direction where:

in segment d1ab the current varies from negative to positive to negative M1 times following a first preamble pattern (a non-periodic pattern is preferred) of M1 high frequency pulses of controlled widths and spacing, where M1 is a positive integer equal to or greater than one;

in segment d2ab the current pulses from negative to positive and back to negative N1 times, following a first servo mark pattern (in one example, when used for timing and tracking, a periodic pattern; however, when servo marks are used to encode information the pattern may be non-periodic) of N1 low frequency pulses of controlled widths and spacings, where N1 is a positive integer equal to or greater than one;

in segment d3ab the current varies from negative to positive to negative P1 times following a first closing pattern (a non-periodic pattern is preferred) of P1 high frequency pulses of controlled widths and spacing, where P1 is a positive integer equal to or greater than one;

in segment d4ab the current is zero or near zero;

in segment d1cd the current varies from negative to positive to negative M2 times, following a second preamble pattern (a non-periodic pattern is preferred) of M2 high frequency pulses of controlled widths and spacing, where M2 is a positive integer greater than or equal to one;

in segment d2cd the current pulses from negative to positive and back to negative N2 times, following a second servo mark pattern (in one example, when used for timing and tracking, a periodic pattern; however, when servo marks are used to encode information the pattern may be non-periodic) of N2 low frequency pulses of controlled widths and spacings, where N2 is a positive integer greater than or equal to one;

in segment d3cd the current varies from negative to positive to negative P2 times, following a second closing pattern (a non-periodic pattern is preferred) of P2 high frequency pulses of controlled widths and spacing, where P2 is a positive integer greater than or equal to one;

in segment d4cd the current is zero or near zero;

the pulse widths and distances between pulses for the patterns of high-frequency current pulses are much smaller than the pulse widths and distances between the pulses for the patterns of low-frequency current pulses; and Sh is the width of the servo track in the Y-direction; and the X-direction is defined as the direction of movement of the magnetic storage medium (e.g., magnetic tape) from the right gap to the left gap and the Y-direction is defined as a direction in the plane of the medium perpendicular to the X-direction.

Figure 4B:
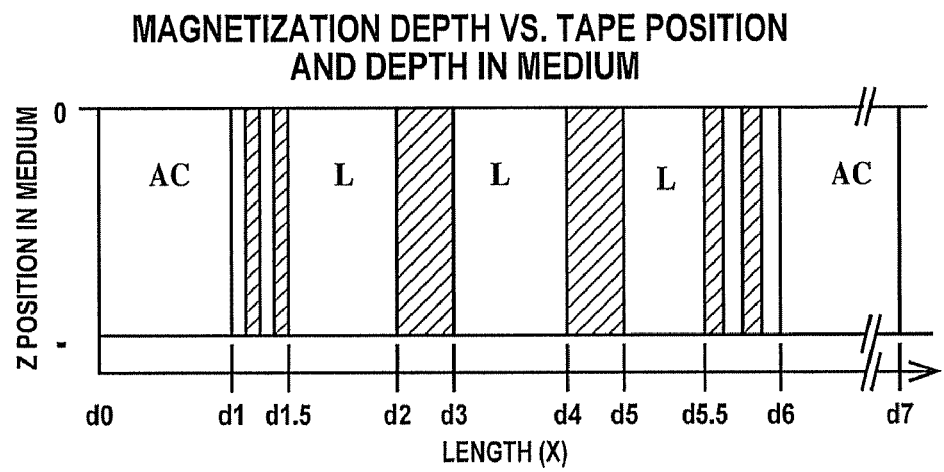
FIG. 4B is a section view of the magnetization state of the medium plotted as medium depth versus medium position generated by the write signal of FIG. 4A.

FIG. 4B is side view of the magnetization state of the medium plotted as medium depth versus medium position generated by the write signal of FIG. 4A. The section is along the Y-direction for a region of the medium. In FIG. 4B, the clear regions are written with the magnetization in the −X (left) direction, the cross-hatched regions are written with the magnetization in the +X (right) direction, and the clear regions labeled "AC" remain AC-erased. The clear regions labeled "L" are DC erased regions between servo marks.

Figure 4C:
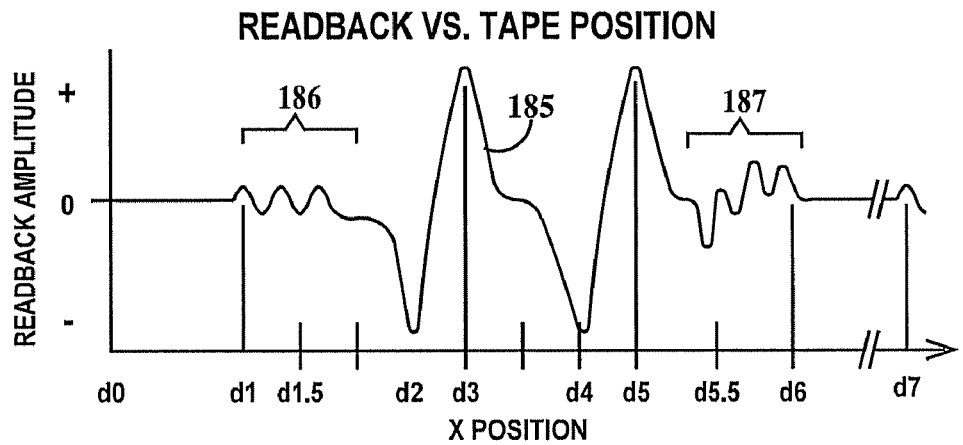
FIG. 4C is a plot of the readback signal of medium written with the write signal of FIG. 4A.

FIG. 4C is a plot of the readback signal of medium written with the write signal of FIG. 4A. In FIG. 4C waveform 185 represents the readback signal. Regions 186 and 187 are regions of undesired signal. Ideally, the signal would be zero in regions 186 and 187. Region 186 is discussed infra, with respect to FIG. 5.

Figure 5:
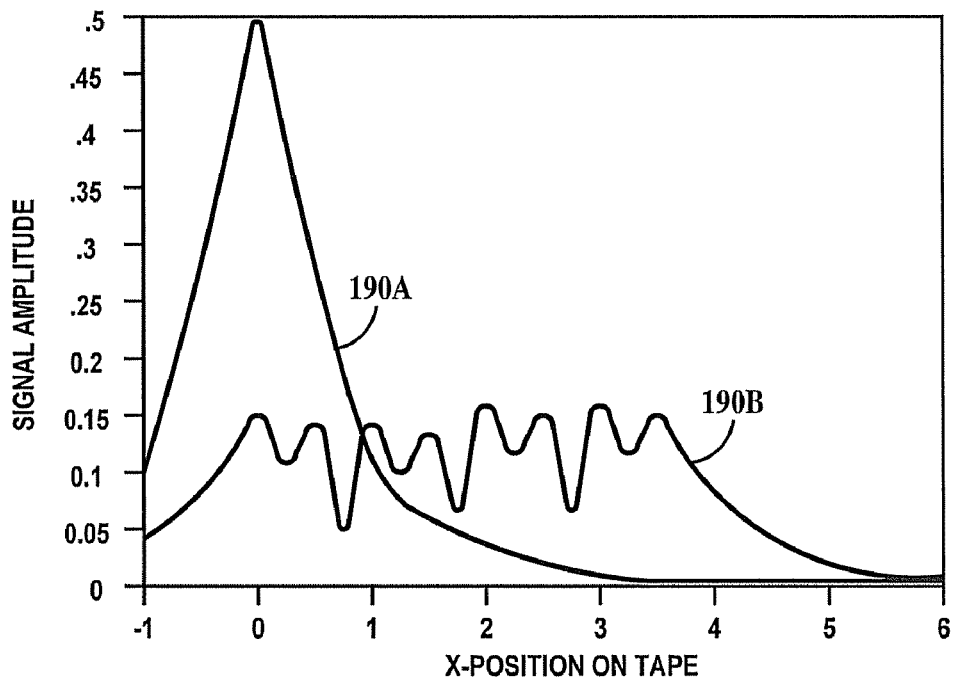
FIG. 5 is a plot of pulse amplitude of the undesired servo mark signals vs. position on the magnetic tape.

FIG. 5 is a plot of pulse amplitude of the undesired servo mark signals vs. position on the magnetic tape. Waveform 190A is the region 186 of waveform 185 of FIG. 4C that would be obtained without a high-frequency preamble, and waveform 190B is the region 186 of waveform 185 of FIG. 4C that is obtained with pattern of M=7 high-frequency pulses in the preamble. Defining PW50 as the width of a pulse resulting from a step function of current varying from i3 to i4, the pattern of M=7 pulses corresponds to ps1=1.5*PW50, pw1=0.15*PW50, ps2=0.35*PW50, pw2=0.2*PW50, ps3=0.35*PW50, pw3=0.15*PW50, ps4=0.4PW50, pw4=0.15*PW50, ps5=0.4*PW50, pw5=0.1*PW50, ps6=0.5*PW50, pw6=0.1*PW50, ps7=0.5*PW50, pw7=0.05*PW50. As can be seen the high-frequency preamble current significantly reduces the amplitude of the undesired signal by about 70%. Similar results are obtained in region 187 of waveform 185 of FIG. 4C using the high-frequency closing. This is an unexpected result.

Figure 6:
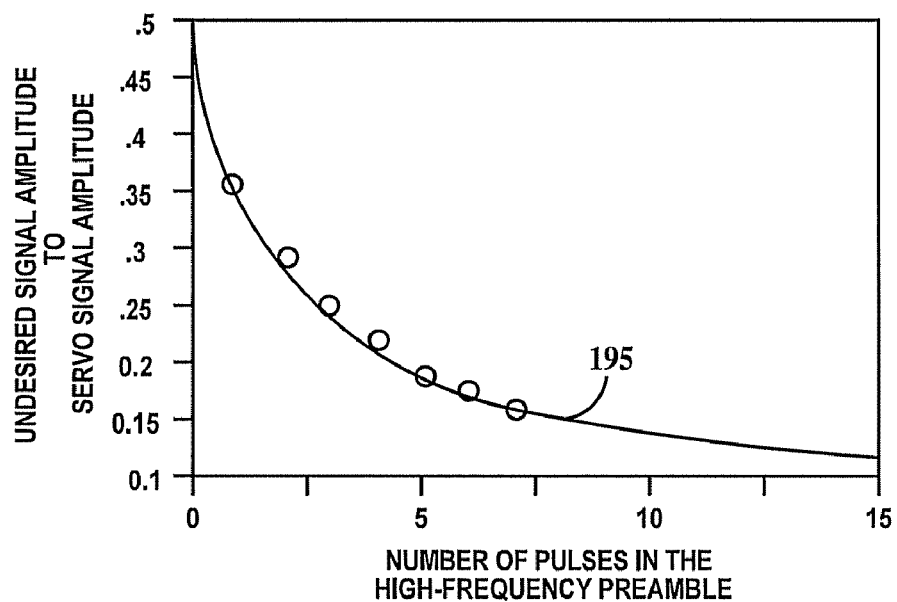
FIG. 6 is a plot of the ratio of the amplitude of the undesired signal to amplitude of the servo mark signal vs. number of pulses in the high-frequency preamble.

FIG. 6 is a plot of the ratio of the amplitude of the undesired signal to amplitude of the servo mark signal vs. number of pulses in the high-frequency preamble. In FIG. 6, curve 195 illustrates that increasing the number of pulses in the high-frequency preamble allows a continuous decrease the amplitude of the undesired signal.

Figure 7:
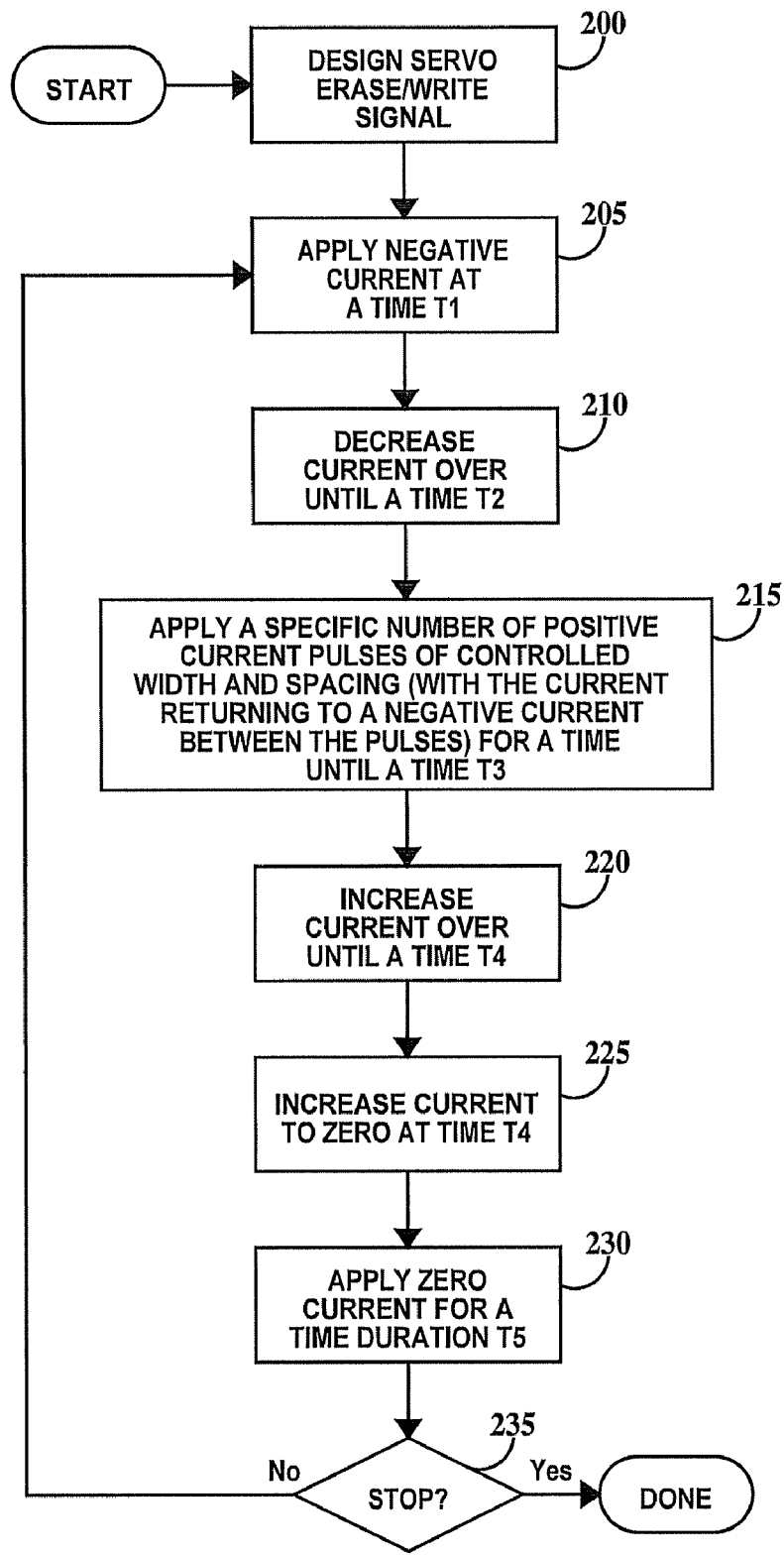
FIG. 7 is a flowchart of the method of writing servo marks according to first embodiments of the present invention.

FIG. 7 is a flowchart of the method of writing servo marks according to first embodiments of the present invention. In the following description, except when referring to numbers of pulses, "negative" may be substituted for "positive" and "positive" substituted for "negative."

In step 200, the servo write signal (e.g., 155 of FIG. 3A, 165 of FIG. 3A, 170 of FIG. 3B) is designed to the conditions of TABLE I. The use of a general purpose computer as an aid in the design of the servo write signal is useful. The servo write signal is supplied to the servo write head (e.g., dual-gap servo write head 100 of FIG. 1A). During steps 205 through 230, the magnetic tape is moving at a constant velocity past the servo write head. Signal design techniques include graphical and numeric methods.

In step 205, from a zero or near zero current level i0, a negative current level i1 is applied to the servo write head at a time T1. Alternatively, when the number of AB servo marks is to be different from the number of CD servo marks, the negative current level i1 is applied for a time T1(1) or T1(2) on alternating passes through the loop 205, 210, 215, 220, 225 and 230.

In step 210, the current is ramped further negative to a negative current level i2 until a time T2. Alternatively, the current is ramped further negative to negative current level i2 until time T2.1<T2, then set to i3 from time T2.1 to time T2, where i3 is more negative than i2. Alternatively, the current is ramped further negative to negative current level i3 until time T2.

Alternatively, in step 210, when the number of AB servo marks is to be different from the number of CD servo marks, the current is ramped further negative to a negative current level i2 until a time T2(1) or T2(2) on alternating passes through the loop 205, 210, 215, 220, 225 and 230. Alternatively, the current is ramped further negative to negative current level i2 until time T2.1(1)<T2(1) or T2.1(2)<T2(2) then set to i3 from time T2.1(1) or T2.1(2) to time T2(1) or T2(2), where i3 is more negative than i2 on alternating passes through the loop 205, 210, 215, 220, 225 and 230. Alternatively, the current is ramped further negative to negative current level i3 until time T2(1) or T2(2) on alternating passes through the loop 205, 210, 215, 220, 225 and 230.

In step 215, the current is pulsed N times from negative current level i3 to positive current level i4 and back to negative current level i3 until a time T3. In one example $|i3|=|i4|$. In one example $|i3|\neq|i4|$. N is a positive integer equal to or greater than one. During time duration T3-T2, pairs of N servo mark are written to the servo track across from both gaps. The trailing edge of the last pulse ends at current level i2.

Alternatively, in step 215, when the number of AB servo marks is to be different from the number of CD servo marks, the current is pulsed N1 or N2 times from negative current level i3 to positive current level i4 and back to negative current level i3 until a time T3(1) or T3(2). In one example $|i3|=|i4|$. In one example $|i3|\neq|i4|$. N1 and N2 are positive integers equal to or greater than one, and N1 is not equal to N2. During time duration T3(1)-T2(1), N1 pairs of servo mark are written to the servo track across from both gaps. During time duration T3(2)-T2(2), N2 pairs of servo mark are written to the servo track across from both gaps. The trailing edge of the last pulse ends at current level i2. N1 pulses or N2 pulses are applied on alternating passes through the loop 205, 210, 215, 220, 225 and 230.

In step 220, between time T3 and a time T4, the current is ramped to current level i1. Alternatively, instead of ramping the current starting at time T3, the current level may be kept at i3 for the period of time as described supra with respect to FIGS. 3A and 3B before ramping to current level i1.

Alternatively, in step 220, when the number of AB servo marks is to be different from the number of CD servo marks, between time T3(1) and T4(1) or between a time T3(2) or T4(2) on alternating passes through the loop 205, 210, 215, 220, 225 and 230, the current is ramped to current level i1. Alternatively, instead of ramping the current starting at time T3(1) or T3(2) on alternating passes through the loop 205, 210, 215, 220, 225 and 230, the current level may be kept at i3 for the period of time as described supra with respect to FIGS. 3A and 3B before ramping to current level i1.

In step 225, at time T4 current level i0 is applied. Alternatively, when the number of AB servo marks is to be different from the number of CD servo marks, at time T4(1) or T4(2) on alternating passes through the loop 205, 210, 215, 220, 225 and 230 current level i0 is applied.

In step 230, for a time duration T5 the current level is maintained at i0. Note, T1<T2<T3<T4. Alternatively, when the number of AB servo marks is to be different from the number of CD servo marks, at time T5(1) or T5(2) on alternating passes through the loop 205, 210, 215, 220, 225 and 230, current level maintained at i0. Note, T1(1)<T2(1)<T3(1)<T4(1) and T1(2)<T2(2)<T3(2)<T4(2).

In step 235, it is determined if writing of servo marks is to be stopped. If no, the method loops back to step 205, otherwise writing of servo marks is terminated.

Figure 8:
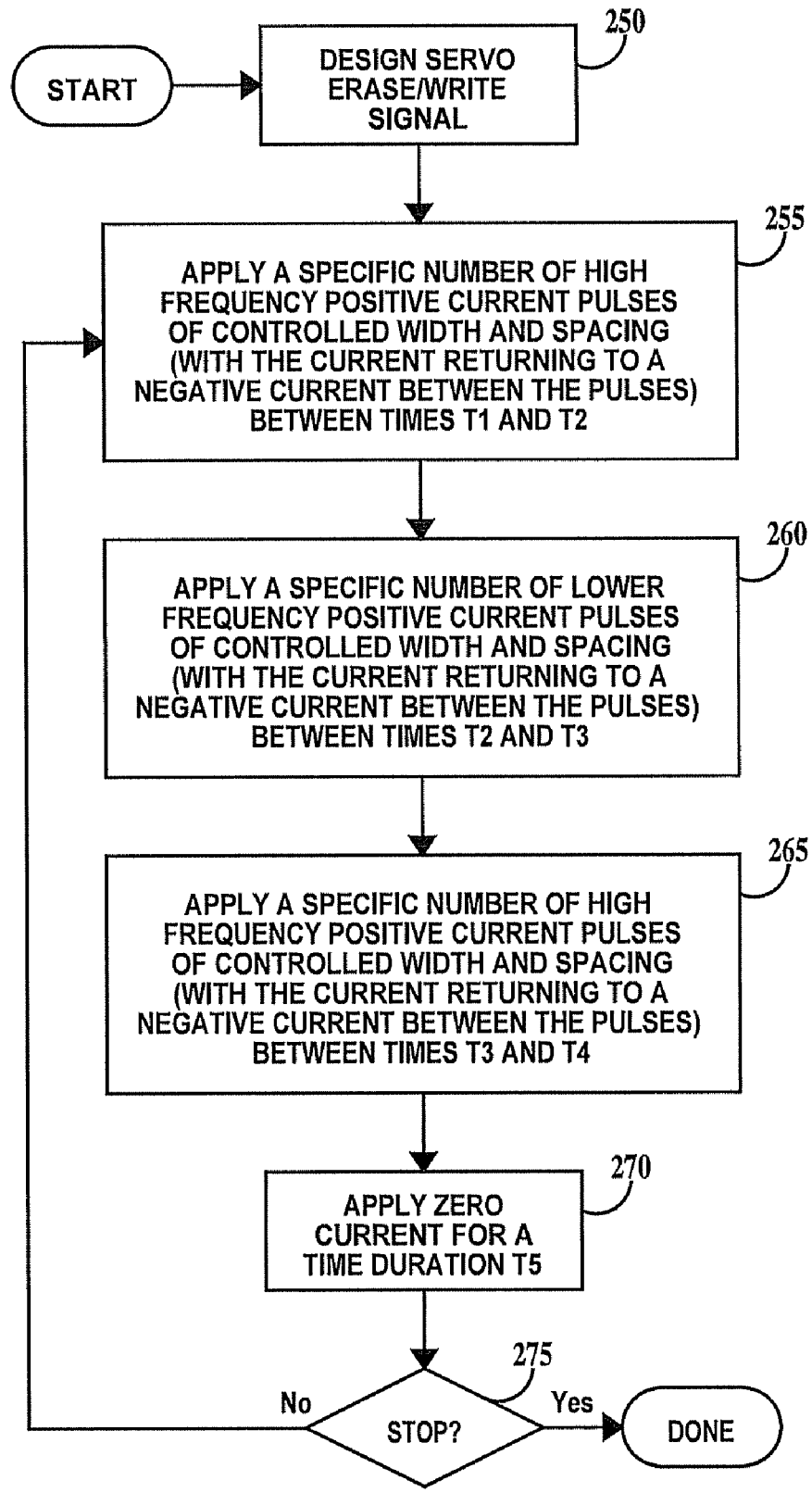
FIG. 8 is a flowchart of the method of writing servo marks according to second embodiments of the present invention.

FIG. 8 is a flowchart of the method of writing servo marks according to first embodiments of the present invention. In the following description, except when referring to numbers of pulses, "negative" may be substituted for "positive" and "positive" substituted for "negative."

In step 250, the servo write signal (e.g., 180 of FIG. 4A) is designed to the conditions of TABLE I. The use of a general purpose computer as an aid in the design of the servo write signal is useful. The servo write signal is supplied to the servo write head (e.g., dual-gap servo write head 100 of FIG. 1A). During steps 255 through 270, the magnetic tape is moving at a constant velocity past the servo write head. Signal design techniques include graphical and numeric methods.

In step 255, from a zero or near zero current level i0, a preamble set of M high-frequency pulses of controlled widths and spacings are applied between a time T1 and a time T2. The current level pulses between a current level i3 and a current level i4. The trailing edge of the last pulse ends at current level i4. In one example $|i3|=|i4|$. In one example $|i3|\neq|i4|$. M is a positive integer equal to or greater than one. Alternatively, in step 255, when the number of AB servo marks is to be different from the number of CD servo marks, a preamble set of M1 pulses between current level i3 and current level i4 are applied between time T1(1) and T2(1), or a preamble set of M2 pulses between current level i3 and current level i4 are applied between time between a time T1(2) and a time T2(2) on alternating passes through the loop 250, 255, 260, 265 and 270. M1 may or may not be equal to M2.

In step 260, the current is pulsed N times from i3 to a current level i4 until a time T3. In one example $|i3|=|i4|$. In one example $|i3|\neq|i4|$. N is a positive integer equal to or greater than one. During time duration T3-T2, pairs of N servo mark are written to the servo track across from both gaps. The trailing edge of the last pulse ends at current level i2.

Alternatively, in step 260, the current is pulsed N1 or N2 times from current level i3 to current level i4 until a time T3(1) or T3(2). N1 and N2 are positive integers equal to or greater than one and N1 is not equal to N2. In one example $|i3|=|i4|$. In one example $|i3|\neq|i4|$. During time duration T3(1)-T2(1), pairs of N1 servo marks are written to the servo track across from both gaps. During time duration T3(2)-T2(2), pairs of N2 servo marks are written to the servo track across from both gaps. The trailing edge of the last pulse ends at current level i3. N1 pulses or N2 pulses are applied on alternating passes through the loop 205,210, 215, 220, 225 and 230.

In step 265, from current level i3, a closing set of P high-frequency pulses of controlled widths and spacings are applied between a time T3 and a time T4. The current level pulses between a current level i3 and a current level i4. The trailing edge of the last pulse ends at current level i0. In one example |i3|=|i4|. In one example |i3|≠|i4|. P is a positive integer equal to or greater than one. Alternatively, in step 265, when the number of AB servo marks is to be different from the number of CD servo marks, a closing set of P1 pulses between current level i3 and current level i4 are applied between a time T3(1) and T4(1), or a closing set of P2 pulses between current level i3 and current level i4 are applied between time between a time T3(2) and a time T4(2) on alternating passes through the loop 250, 255, 260, 265 and 270. P1 may or may not be equal to P2.

There are multiple permutations of N1, N2, P1, P2, M1 and M2, ten of which are: (1) N1=N2, M1=M2=P1=P2; (2) N1=N2, M1=M2, P1=P2, M1≠P1; (3) N1=N2, M1≠M2, P1=P2; (4) N1=N2, M1=M2, P1≠P2; (5) N1=N2, M1≠M2, P1≠P2; (6) N1≠N2, M1=M2=P1=P2; (7) N1≠N2, M1=M2, P1=P2, M1≠P1; (8) N1≠N2, M1≠M2, P1=P2; (9) N1≠N2, M1=M2, P1≠P2; (10) N1≠N2, M1≠M2, P1≠P2.

In step 270, for a time duration T5 the current level is maintained at i0. Note, T1<T2<T3<T4.

In step 270, for a time duration T5 the current level i0 is maintained at i0. Alternatively, when the number of AB servo marks is to be different from the number of CD servo marks, for a time duration T5(1) or T5(2) on alternating passes through the loop 250, 255, 260, 265 and 270 the current level is maintained at i0.

In step 275, it is determined if writing of servo marks is to be stopped. If no, the method loops back to step 255 otherwise writing of servo marks is terminated.

The present invention may take the form of first and second apparatuses. The first apparatus, comprising: a servo write head having a first write gap and second write gap spaced apart and an induction coil configured to generate respective magnetic fields proximate to the first and second gaps when a current is applied to said coil by a bipolar servo write driver, the bipolar servo write driver configured to generate both negative and positive polarity currents, the bipolar servo write driver configured to generate a varying current signal; a component that moves a magnetic storage medium past the first and second write gaps in a direction from the first write gap toward the second write gap; wherein the varying current signal includes a non-write phase, a preamble phase, a servo mark write phase and a closing phase, the varying current at an initial current level during the non-write phase, the preamble phase comprising an abrupt change in current from the initial current level to a first current level and a first current ramp from the first current level to a second current level, the servo mark write phase comprising current pulses between third and fourth current levels to write servo marks, and the closing phase comprising a second current ramp from the second current level to the first current level and an abrupt change in current from the first current level to the initial current level; and wherein servo marks are written only during the servo mark write phase.

The second apparatus, comprising: a servo write head having a first write gap and second write gap spaced apart and an induction coil configured to generate respective magnetic fields proximate to the first and second gaps when a current is applied to said coil by a bipolar servo write driver, the bipolar servo write driver configured to generate both negative and positive polarity currents, the bipolar servo write driver configured to generate a varying current signal; a component that moves a magnetic storage medium past the first and second write gaps in a direction from the first write gap toward the second write gap; wherein the varying current signal comprises a non-write phase, preamble phase, a servo mark write phase and a closing phase, during the non-write phase, the varying current is at an initial current level, the preamble phase comprises a preamble pattern of high-frequency current pulses varying from a first current level to a second current level and back to the first current level, the servo mark write phase comprises a servo mark pattern of low-frequency current pulsing between the first and second current levels to write servo marks, and the closing phase comprises a closing pattern of high-frequency current pulses varying between the first current level to the second current level and back to the first current level; and wherein servo marks are written only during the servo mark write phase.

Thus, the embodiments of the present invention provide apparatuses and methods for bipolar writing servo marks to magnetic storage medium with increased readback signal amplitude while reducing undesirable pulses into the readback signal. It should be understood that while magnetic tape has been used in describing the embodiments of the present invention, the embodiments of the present invention are applicable to any moving magnetic storage medium.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
providing a servo write head having a first write gap and a second write gap spaced apart and an induction coil configured to generate respective magnetic fields proximate to said first and said second write gaps when a current is applied to said coil by a bipolar servo write driver, said bipolar servo write driver configured to generate both negative and positive polarity currents;
generating a varying current signal using said bipolar servo write driver;
moving a magnetic storage medium past said first and said second gaps in a direction from said first write gap toward said second write gap;
said varying current signal includes a non-write phase, a preamble phase, a servo mark write phase and a closing phase;
said varying current at an initial current level during said non-write phase;
said preamble phase comprising an abrupt change in current from said initial current level to a first current level and a first current ramp from said first current level to a second current level;
said servo mark write phase comprising current pulses between third and fourth current levels to write servo marks;
said closing phase comprising a second current ramp from said second current level to said first current level and an abrupt change in current from said first current level to said initial current level; and
wherein servo marks are written only during said servo mark write phase.

2. The method of claim 1, wherein said second current level is between said first and said third current levels.

3. The method of claim 1, wherein said second current level and said third current level are substantially the same current level.

4. The method of claim 1, wherein the magnitude of said second current level is greater than the magnitude of said first current level.

5. The method of claim 1, wherein said third and said fourth current levels are of opposite polarity.

6. The method of claim 1, wherein magnitudes of said third and said fourth current levels are greater than magnitudes of said initial, said first and said second current levels.

7. The method of claim 1, including:
simultaneously writing servo marks to different regions of said servo track of said magnetic storage medium as said magnetic storage medium passes said first and said second write gaps.

8. The method of claim 1, including:
periodically reducing the magnitude of said varying current to prevent regions of said servo track written by said first write gap from being overwritten and/or erased by said second write gap.

9. The method of claim 1, wherein applying said varying current includes, in the following order:
(a) for a length of time T1, applying said initial current level, said initial current level corresponding to a current that does not change the magnetic state of said magnetic medium;
(b) abruptly changing from said initial current level to said first current level;
(c) over a length of time T2, ramping said varying current from said first current level to said second current level;
(d) for a length of time T3, pulsing said varying current from a first polarity to a second polarity and back to said first polarity N times to write a set of N servo marks, where N is a positive integer equal to or greater than one, said second polarity of an opposite polarity from said first polarity;
(e) over a length of time T4, ramping said varying current from said third current level to said fourth current level;
(f) abruptly changing from said first current level to said initial current level; and
repeating (a) through (f) multiple times.

10. The method of claim 1, wherein applying said varying current includes, in the following order:
(a) for a length of time T1, applying said initial current level, said initial current level corresponding to a current that does not change the magnetic state of said magnetic medium;
(b) abruptly changing from said initial current level to said first current level;
(c) over a length of time T2, ramping said varying current from said first current level to said second current level;
(d) for a length of time T3, pulsing said varying current from a first polarity to a second polarity and back to said first polarity N times to write a set of N servo marks, said second polarity of an opposite polarity from said first polarity;
(e) over a length of time T4, ramping said varying current from said third current level to said fourth current level;
(f) abruptly changing from said first current level to said initial current level; and
repeating (a) through (f) multiple times wherein N alternates between two different positive integers that are greater than one and (i) T1, T2, T3 and T4 remain substantially the same, (ii) T1, T2, T3 and T4 each alternates between a respective pair of different values, or (iii) one or more of T1, T2, T3 and T4 remain substantially the same and one or more of T1, T2, T3 and T4 alternates between a respective pair of different values.

11. The method of claim 1, including:
wherein the waveform of said varying current signal is based on the inequalities:

$$d3ab < Sg - d2ab - Wl - [(Sh/2)*((\tan(Al) + \tan(Ar))];$$

$$d1cd < AC - Sg - d2ab - [(Sh/2)*((\tan(Al) + \tan(Ar))];$$

$$d3cd < Sg - d2cd - Wl - [(Sh/2)*((\tan(Al) + \tan(Ar))];$$

$$d1ab < CA - Sg - d2cd - [(Sh/2)*((\tan(Al) + \tan(Ar))];$$

where:
$AC = d2ab + d3ab + d4ab + d1cd$;
$CA = d2cd + d3cd + d4cd + d1ab$;
Sg is the center-to-center distance between the left and right gaps;
Wl is the width of the left gap in the X-direction;
Wr is the width of the right gap in the X-direction;
Al is the angle of the left gap slanted away from the Y-direction;
Ar is the angle of the right gap slanted away from the Y-direction;
d1ab, d2ab, d3ab, d4ab, d1cd, d2cd, d3cd and d4cd are sequential segments along the magnetic tape in the X-direction where:
in segment d1ab the current ramps negative;
in segment d2ab the current pulses from negative to positive and back to negative N1 times, where N1 is a positive integer equal to or greater than one;
in segment d3ab the current ramps positive;
in segment d4ab the current does not change the magnetic state of said magnetic medium;
in segment d1cd the current ramps negative;
in segment d2cd the current pulses from negative to positive and back to negative N2 times, where N2 is a positive integer equal to or greater than one and N1 is not equal to N2; and
in segment d3cd the current ramps positive;
in segment d4cd the current is a zero current or a current that does not change the magnetic state of said magnetic medium; and
Sh is the width of the servo track in the Y-direction; and
the X-direction is defined as the direction of movement of the magnetic storage medium from the right gap to the left gap, and the Y-direction is defined as a direction in a plane of said magnetic storage medium perpendicular to the X-direction.

12. A method, comprising:
providing a servo write head having a first write gap and a second write gap spaced apart and an induction coil configured to generate respective magnetic fields proximate to said first and said second gaps when a current is applied to said coil by a bipolar servo write driver, said bipolar servo write driver configured to generate both negative and positive polarity currents;
generating a varying current signal using said bipolar servo write driver;
moving a magnetic storage medium past said first and said second write gaps in a direction from said first write gap toward said second write gap;
said varying current signal comprises a non-write phase, preamble phase, a servo mark write phase and a closing phase;
during said non-write phase, said varying current is at an initial current level;

said preamble phase comprises a preamble pattern of high-frequency current pulses between a first current level and a second current level and back to said first current level;

said servo mark write phase comprises a servo mark pattern of low-frequency current pulses between said first current level and said second current level and back to said first current level for writing servo marks;

said closing phase comprises a closing pattern of high-frequency current pulses between said first current level and said second current level and back to said first current level; and wherein servo marks are written only during said servo mark write phase.

13. The method of claim 12, wherein said first and said second current levels are of opposite polarity.

14. The method of claim 12, wherein widths of pulses and distances between pulses of said servo mark pattern of low-frequency pulses are larger than the widths of pulses and distances between pulses of said preamble and closing patterns of high-frequency pulses.

15. The method of claim 12, wherein widths of pulses and distances between pulses of said preamble pattern of high-frequency pulses are different than widths of pulses and distances between pulses of said closing pattern of high-frequency pulses.

16. The method of claim 12, including:
simultaneously writing servo marks to different regions of said servo track of said magnetic storage medium as said magnetic storage medium passes said first and second write gaps.

17. The method of claim 16, wherein applying said varying current includes, in the following order:
(a) for a length of time T1, applying said initial current level, said initial current corresponds to a current that does not change the magnetic state of said magnetic medium;
(b) for a length of time T2 applying M pulses of said preamble pattern of high-frequency current pulses where M is a positive integer equal to or greater than one;
(c) for a length of time T3, pulsing said varying current from a first polarity to a second polarity and back to said first polarity N times to write a set of N servo marks, where N is a positive integer equal to greater than one, said first polarity of an opposite polarity from said first polarity;
(d) for a length of time T4 applying P pulses of said closing pattern of high-frequency current pulses, where P is a positive integer equal to or greater than one; and
repeating (a) through (d) multiple times:
wherein N alternates between two different positive integers that are greater than one, wherein (i) M and P remain the same, (ii) M and P each alternates between a respective pair of different values, or (iii) M or P alternates between a respective pair of different values; and
wherein (iv) T1, T2, T3 and T4 remain substantially the same, (v) T1, T2, T3 and T4 each alternates between respective pairs of different values, or (vi) one or more of T1, T2, T3 and T4 remain substantially the same and one or more of T1, T2, T3 and T4 alternates between respective pairs of different values.

18. The method of claim 12, including:
periodically reducing the magnitude of said varying current to prevent regions of said servo track written by said second write gap from being overwritten and/or erased by said first write gap.

19. The method of claim 12, wherein applying said varying current includes, in the following order:
(a) for a length of time T1, applying said initial current level, said initial current corresponding to a current that does not change the magnetic state of said magnetic medium;
(b) for a length of time T2 applying M pulses of said preamble pattern of high-frequency current pulses where M is a positive integer equal to or greater than one;
(c) for a length of time T3, pulsing said varying current from a first polarity to a second polarity and back to said first polarity N times to write a set of N servo marks, where N is a positive integer equal to or greater than one, said first polarity of an opposite polarity from said first polarity;
(d) for a length of time T4 applying P pulses of said closing pattern of high-frequency current pulses, where P is a positive integer equal to or greater than one; and
repeating (a) through (d) multiple times.

20. The method of claim 12, including:
wherein the waveform of said varying current signal is based the inequalities:

$$d3ab < Sg - d2ab - Wl - [(Sh/2)*((\tan(Al) + \tan(Ar))];$$

$$d1cd < AC - Sg - d2ab - [(Sh/2)*((\tan(Al) + \tan(Ar))];$$

$$d3cd < Sg - d2cd - Wl - [(Sh/2)*((\tan(Al) + \tan(Ar))];$$

$$d1ab < CA - Sg - d2cd - [(Sh/2)*((\tan(Al) + \tan(Ar))];$$

where:
AC=d2ab+d3ab+d4ab+d1cd;
CA=d2cd+d3cd+d4cd+d1ab;
Sg is the center-to-center distance between said first and second gaps;
Wl is the width of said second write gap in an X-direction;
Wr is the width of said first write gap in said X-direction;
Al is the angle the second write gap slanted away from a Y-direction;
Ar is the angle of the first write gap slanted away from said Y-direction;
d1ab, d2ab, d3ab, d4ab, dicd, d2cd, d3cd and d4cd are sequential segments along the magnetic tape in the X-direction where:
in segment d1ab there are M1 pulses of a first preamble pattern of high-frequency current pulses where M1 is a positive integer greater than or equal to one;
in segment d2ab there are N1 pulses of a first servo mark pattern of low-frequency current pulses where N1 is a positive integer greater than or equal to one;
in segment d3ab there are P1 pulses of a first closing pattern of high-frequency current pulses where P1 is a positive integer greater than or equal to one;
in segment d4ab the current is zero or near zero;
in segment d1cd there are M2 pulses of a second preamble pattern of high-frequency current pulses where M2 is a positive integer greater than or equal to one;
in segment d2cd there are N2 pulses of a second servo mark pattern of low-frequency current pulses where N2 is a positive integer greater than or equal to one and N1 is not equal to N2;
in segment d3cd there are P2 pulses of a second closing pattern of high-frequency current pulses where P2 is a positive integer greater than or equal to one;

in segment d4cd the current is zero or near zero; and

Sh is the width of the servo track in the Y-direction; and said X-direction is defined as the direction of movement of the magnetic storage medium from said first write gap to said second write gap and the Y-direction is defined as a direction in a plane of said magnetic storage medium perpendicular to said X-direction.

* * * * *